(12) United States Patent
Liu

(10) Patent No.: US 7,801,032 B2
(45) Date of Patent: Sep. 21, 2010

(54) SYSTEM AND METHOD OF DYNAMIC QOS NEGOTIATION IN NEXT GENERATION NETWORK

(75) Inventor: Enhui Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 521 days.

(21) Appl. No.: 10/593,251

(22) PCT Filed: Sep. 7, 2005

(86) PCT No.: PCT/CN2005/001421

§ 371 (c)(1),
(2), (4) Date: Sep. 15, 2006

(87) PCT Pub. No.: WO2006/026920

PCT Pub. Date: Mar. 16, 2006

(65) Prior Publication Data

US 2007/0201366 A1   Aug. 30, 2007

(30) Foreign Application Priority Data

Sep. 8, 2004   (CN) .................. 2004 1 0079929

(51) Int. Cl.
*H04L 12/26* (2006.01)
(52) U.S. Cl. .................. 370/230; 370/252
(58) Field of Classification Search ........... 370/230, 370/229, 235, 252, 351, 389, 395.1, 395.2, 370/395.21
See application file for complete search history.

(56) References Cited

U.S. PATENT DOCUMENTS

2001/0026554 A1 * 10/2001 Holler et al. ............... 370/401

2002/0136162 A1 * 9/2002 Yoshimura et al. ........... 370/229
2003/0112766 A1 * 6/2003 Riedel et al. ................ 370/252

(Continued)

FOREIGN PATENT DOCUMENTS

CN    1426263 A    6/2003

(Continued)

OTHER PUBLICATIONS

European Search Report issued in European Patent Application No. EP 05 78 3992, mailed Jun. 27, 2008.

(Continued)

*Primary Examiner*—Derrick W Ferris
*Assistant Examiner*—Omar Ghowrwal
(74) *Attorney, Agent, or Firm*—Slater & Matsil, L.L.P.

(57) ABSTRACT

The present invention discloses a system and a method of dynamic QoS negotiation in NGN. The Resource and Admission Control Subsystem (RACS) provides intercommunication interfaces with Transport functional (TF) entity, Service Control Functional (SCF) entities, and Network Attachment Subsystem (NASS), and thereby, when a user terminal in NGN is to develop a service with QoS requirement, the RACS can obtain the QoS requirement parameters of a service, determine the admission control decision parameters in accordance with the QoS requirement parameters, and the RACS send the determined admission control decision parameters to the TF entity for execution, such that the QoS assurance for the service is realized.

The present invention allows an end-to-end QoS negotiation in NGN in accordance with the availability of current transport network resources, and thereby can effectively improve the transport resource utilities. Therefore, the present invention can effectively ensure QoS of service transported in NGN.

13 Claims, 5 Drawing Sheets

U.S. PATENT DOCUMENTS

| | | | |
|---|---|---|---|
| 2003/0129988 A1* | 7/2003 | Lee et al. | 455/450 |
| 2003/0204616 A1* | 10/2003 | Billhartz et al. | 709/235 |
| 2004/0022191 A1* | 2/2004 | Bernet et al. | 370/230 |
| 2004/0131042 A1* | 7/2004 | Lillie et al. | 370/351 |
| 2004/0151114 A1* | 8/2004 | Ruutu | 370/230 |
| 2004/0228363 A1* | 11/2004 | Adamczyk et al. | 370/468 |
| 2007/0005368 A1* | 1/2007 | Chutorash et al. | 704/275 |

FOREIGN PATENT DOCUMENTS

| | | |
|---|---|---|
| CN | 1490959 A | 4/2004 |
| EP | 1 324 628 A1 | 7/2003 |
| JP | 2004-140486 A | 5/2004 |
| WO | WO 02/05068 A2 | 1/2002 |

OTHER PUBLICATIONS

ITU WG3: "Revision 1 of TR-RACS, FGNGN-OD-00074" ITU-T Internal Document, International Telecommunication Union, Geneva CH, Dec. 3, 2004, pp. 1-22, XP002424686.

"NGN Functional Architecture; Resource and Admission Control Subsystem (RACS); Release 1; Draft ETSI ES 2XX XXX", ETSI Standards, LIS, No. V 1.5.0, Jan. 1, 2005, XP014028861.

Huawei Technologies Co., et al., "Proposal of the generic RACS functional architecture", ETSI TISPAN, XX, XX, No. 4td170r1, Sep. 13, 2004, pp. 1-5, XP002424685.

* cited by examiner

SYSTEM AND METHOD OF DYNAMIC QOS NEGOTIATION IN NEXT GENERATION NETWORK

RELATED APPLICATIONS

This application is the U.S. National Phase under 35 U.S.C. §371 of International Application No. PCT/CN2005/001421, filed on Sep. 7, 2005, which in turn claims the benefit of Chinese Application No. 200410079929.4, filed on Sep. 8, 2004, the disclosures of which Applications are incorporated by reference herein.

FIELD OF THE INVENTION

The present invention relates to network communication technology field, especially to a system and method of dynamic QoS negotiation in NGN.

BACKGROUND OF THE INVENTION

One of the characteristics of Next Generation Network (NGN) is that the service layer is separated from the transport layer, and the transport layer is usually implemented based on packet switching technology and optical technology. At present, the TISPAN workgroup of Europe Telecom Standard Institute (ETSI) has established a functional framework of NGN, that supports Fixed-Mobile Convergence, on the basis of Third Generation IP Multimedia Subsystem (3G IMS). As shown in FIG. 1, the framework includes a service layer and an IP (Internet Protocol)-based transport layer.

As shown in FIG. 1, the service layer is composed of Network Attachment Subsystem (NASS), Resource and Admission Control Subsystem (RACS), IP Multimedia Subsystem (IMS), PSTN/ISDN Emulation Subsystem (PES), other multimedia subsystems and applications, and common service components of those subsystems; the common service components include application servers, charging functions, user profile management, and security control, etc.

Under the control of NASS and RACS, the transport layer provides IP connections between NGN terminals, which hides the transport techniques used in access and core networks below IP layer. Those subsystems can be distributed in the administrative domains of network/service providers.

In an NGN environment, a critical component that provides support for end-to-end QoS control is RACS. The position of RACS in the overall framework of NGN and the interface relationship between the RACS and the external entities are shown in FIG. 2. The RACS needs to have interfaces with the transport layer, customer premise equipments (CPEs), NASS, IMS, PES, other service subsystems, and RACSs in other networks. RACS provides admission control function; the admission control includes resource availability check based on the user profiles stored in NASS. Resource availability check means the admission control verifies whether the requested bandwidth is consistent with the subscribed bandwidth and the used bandwidth of each user.

Due to diversity and multimedia feature of NGN services, how to implement QoS control on user service on the basis of IP-based transport layer has become an important task in NGN technical research. To this end, Internet Engineering Task Force (IETF) has put forward Integrated Service/Resource Reservation Protocol (IntServ/RSVP), Differentiated Service (DiffServ), and their policy control models and mechanisms.

In IntServ/RSVP and its policy control model put forward by IETF and the Next Step IP Signaling (NSIS) draft that is being established, as shown in FIG. 3, users can transfer QoS parameters to the network through dedicated resource reservation signaling, to request for an expected QoS assurance level. Due to the fact that both RSVP and NSIS operate on the transport layer and pass through the same route and path as the data flow does, it is required that the CPEs support either RSVP or NSIS protocol, so as to send explicit QoS requests to the network. Such a QoS assurance method is inapplicable for users who can not initiate explicit QoS requests to the network.

In actual applications, i.e., in the current network environments, most of the CPEs (i.e., users) do not support RSVP/NSIS protocol. In addition, even if new user terminals will support RSVP/NSIS protocol gradually, it is required to provide QoS requirements that can meet the users' traffic flow on the network side. However, the Policy Decision Function (PDF) performs admission control and gate control only based on user profile and the operator's management policy rules without checking the availability of network resources based on resource status; and, consequently, assured QoS can not be provided in accordance with the actual conditions of the network.

IETF has also put forward DiffServ and its policy control model, as shown in FIG. 4. In detail, the user makes requests and negotiations with the network on QoS, by using either of the following two methods:

One method is: CPEs perform traffic classification, Diffserv marking, policing, and shaping for the user packets; the network equipment trusts the DiffServ marks in the user packets and performs Diffserv forwarding.

The other method is: users subscribe Service Level Agreement (SLA) with the network operator through an administrative approach; the SLA contains the required QoS parameters (e.g., bandwidth and DiffServ type) for user traffic. Network Management System (NMS) statically configures the QoS parameters requested by users onto edge devices of the network via policy control interface or network management interface. The edge devices perform traffic classification, Diffserv marking, policing, and shaping on the user packets in accordance with the QoS configuration; the core devices perform DiffServ forwarding in accordance with the DiffServ marks in the packets marked by the edge devices.

In DiffServ and its policy control model put forward by IETF, users perform QoS negotiation with the network in the management plane. In the network, the user QoS request is represented with the value of the Diffserv mark in the packet. Since a DiffServ mark has a length of only 3 bits, which can only reflect the relative requirements including QoS level and priority but can not transfer the user expected QoS parameters from end to end, including bandwidth, delay, jitter, and packet loss rate, etc.; therefore, the user traffic can only be provided with a relative QoS differentiation from the network. In addition, it is unable to implement QoS assurance for user service based on network resource availability as well.

SUMMARY OF THE INVENTION

In the present invention, there is provided a system of dynamic QoS negotiation in NGN, including:

a Resource and Admission Control Subsystem (RACS), adapted to obtain and process resource reservation requests required for a media flow of a service transported in NGN, perform authentication and make admission control decisions based on operation policy rules, user profile, and availability of transport resources, and send the admission control decision parameters to a concerned transport functional (TF) entity for execution, wherein the reservation request contains QoS requirement parameters;

the transport functional entities, adapted to ensure QoS of the media flow of the service transferred in NGN according to the admission control decision parameters.

The system of dynamic QoS negotiation in NGN further includes:

a service control functional (SCF) entity, adapted to communicate with user terminals, obtain the QoS requirement parameters required for the service requested by a user terminal by parsing service signaling or determine the QoS requirement parameters according to the service policies, and send the QoS requirement parameters to the RACS.

The system of dynamic QoS negotiation in NGN further includes:

a Network Attachment Subsystem (NASS), adapted to manage and configure user access network, communicate with the RACS and the SCF entity, and provide the RACS and the SCF entity with user profile information associated with the service.

The present invention also provides a method of dynamic QoS negotiation in NGN, including:

A. obtaining by a RACS in NGN QoS requirement parameters required by a media flow of a service;

B. performing by the RACS admission control in accordance with the QoS requirement parameters and determining admission control decision parameters;

C. sending by the RACS the admission control decision parameters to a concerned transport functional (TF) entity at network boundary, executing by the transport functional entity at network boundary the admission control decision parameters to process and transfer the media flow of the service accordingly.

Wherein:

the RACS obtains the QoS requirement parameters of the media flow of the given service through a Service Control Functional (SCF) entity, a Network Attachment Subsystem (NASS), the TF entity, or a Network Management System (NMS).

When the service includes a plurality of media flows, it is needed to determine the QoS requirement parameters for each of the media flows respectively.

Before the step of obtaining by a RACS in NGN QoS requirement parameters required by a media flow of a service, the method further includes a step E:

initiating by a user terminal a service request to a SCF entity;

when the service request does not carry the QoS requirement parameters of the media flow of the service, determining by the SCF entity the type of the service in accordance with the service request, and determining the QoS requirement parameters required for the media flow of the service in accordance with the service type;

when the service request carries the QoS requirement parameters of the service, obtaining by the SCF entity the QoS requirement parameters of the media flow of the service by parsing the service request signaling.

If the user terminal is a fixed terminal, the step E further includes:

sending by the SCF entity a resource reservation request containing the QoS requirement parameters of the media flow of the service to the RACS via a corresponding interface with the RACS.

If the user terminal is a mobile terminal, the step E further includes:

Sending by the SCF entity a resource authentication request containing the QoS requirement parameters of the media flow of the service to the RACS via a corresponding interface with the RACS;

after the RACS authenticates successfully, notifying by the RACS the user terminal via the SCF entity;

initiating by the user terminal a resource reservation request to the TF entities of the network via a path-coupling QoS signaling carrying the QoS requirement parameters of the media flow of the service; handling by the TF entity at network boundary the QoS signaling and sending a resource reservation request containing the QoS requirement parameters of the media flow of the service to the RACS via a corresponding interface with the RACS.

If the token mechanism is used, after authenticating successfully, returning by the RACS an admission token to the user terminal via the SCF entity; carrying the admission token in a path-coupling QoS signaling and transferring the admission token to the RACS via a resource reservation request; checking by the RACS whether the resource reservation request has passed the authentication and searching for relevant information of the service in accordance with the admission token.

The RACS determines the admission control decision parameters through the following steps:

obtaining, by the RACS, the user profile information of the service and the policy rules information configured by the operator, making admission control decision for the QoS requirement parameters of the service based on the user profile information and the policy rules information, deciding whether to permit the media the flow of the service to enter into the transport network and to be treated with the requested QoS, and determining the admission control decision parameters.

The RACS may also determine the admission control decision parameters through the following steps:

obtaining by the RACS the current status information of the transport resources in the network, making admission control decision for the QoS requirement parameters of the media flow of the service based on above information, checking whether there are enough transport resources available in the network to meet the QoS requirement parameters of the media flow of the service, and determining the admission control decision parameters.

The admission control decision parameters include:

Gate control, bandwidth allocation, Differentiated Service Code Point (DSCP) mark, and outgoing aggregation path information.

The QoS parameters include:

bandwidth requirements for transferring the media flow of the service, as well as QoS classes indicating allowable delay, jitter, packet error rate and packet loss rate.

The method of dynamic QoS negotiation in NGN further includes:

directly initiating by the user terminal a resource reservation request to the TF entities for the media flow of the service via a path-coupling dedicated QoS signaling;

when the TF entity at network boundary receives the resource reservation request from the user terminal, sending by the entity a resource reservation request carrying the QoS requirement parameters of the media flow of the user service to the RACS, and executing the step C.

The method of dynamic QoS negotiation in NGN further includes:

Configuring, by the NMS or the NASS, gate control, bandwidth allocation, DSCP marking control, and outgoing aggregation path parameters onto the TF entity at network boundary via the RACS.

It can be seen from the above technical solution provided in the present invention that the present invention provides end-to-end dynamic QoS request and negotiation processing procedures for different types of user terminals in NGN. Through the interaction between users and network as well as the interaction between network service layer and transport layer, the present invention is applicable to dynamic QoS negotiation processing for user terminals with different capabilities and for different business models required by the operators; furthermore, the present invention mainly utilizes the RACS in NGN to perform QoS negotiation processing, so as to implement an end-to-end QoS negotiation processing in accordance with the availability of current network transport resources in NGN, and thereby improve resource utilities with QoS treatment. Therefore, the present invention can effectively ensure the QoS of service transferred in NGN.

DETAILED DESCRIPTION OF THE EMBODIMENTS

The key idea of the present invention is to utilize RACS to obtain QoS parameter information required for a media flow of given service requested by CPEs and determine the corresponding admission control decision parameters based on the QoS parameter information and resource availability information, and finally to utilize transport functional entity to execute the admission control decision parameters so as to process and transfer the media flow of the service accordingly, and thereby providing corresponding QoS assurance for services transferred in the network.

First, in the present invention, in view of the diversity of access technologies and CPEs in NGN, it is required to investigate how user terminals with different QoS negotiation abilities and employing different access technologies can request and negotiate QoS with the network dynamically, with support of different business models taken into account. Second, since the various administrative domains in NGN may employ different QoS technologies in data plane and business models, it is required to consider how to support the QoS requirements of user traffic across different administrative domains and different QoS technology domains.

Figure 1:
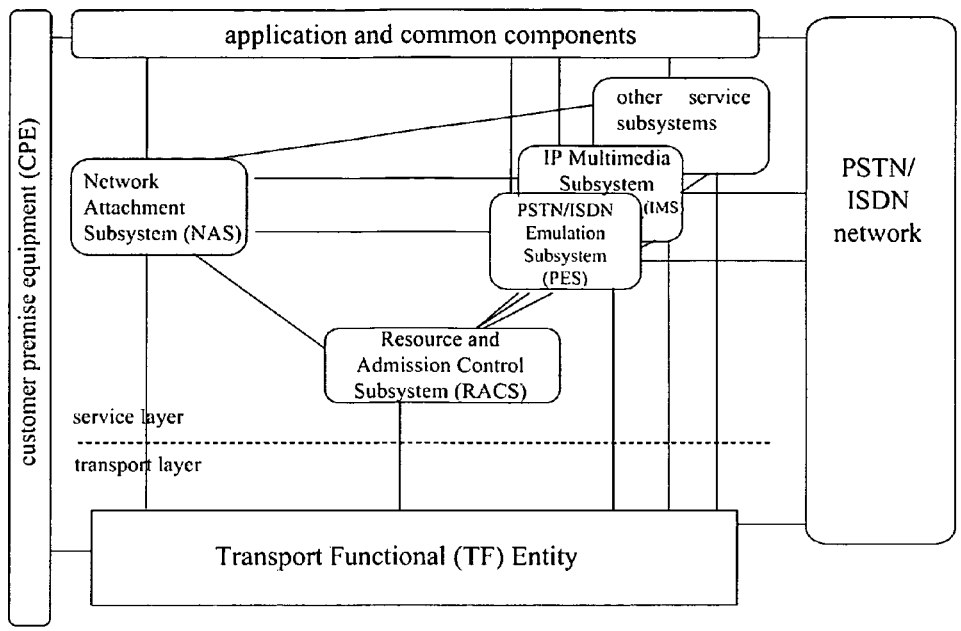
FIG. 1 is a structural schematic diagram of NGN.
Figure 2:
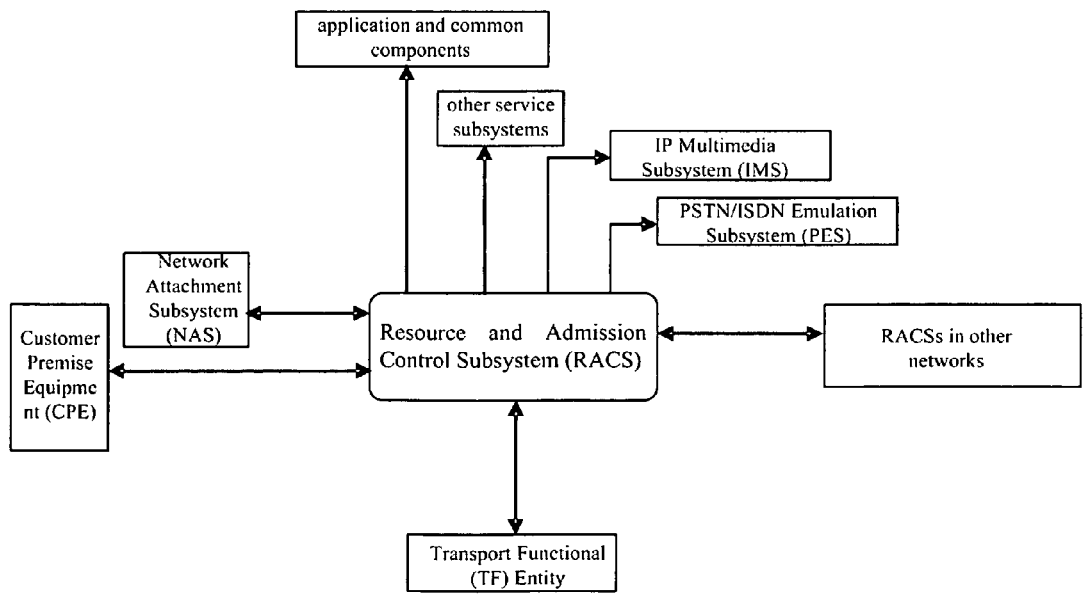
FIG. 2 is a schematic diagram of the external interface of RACS in NGN.
Figure 3:
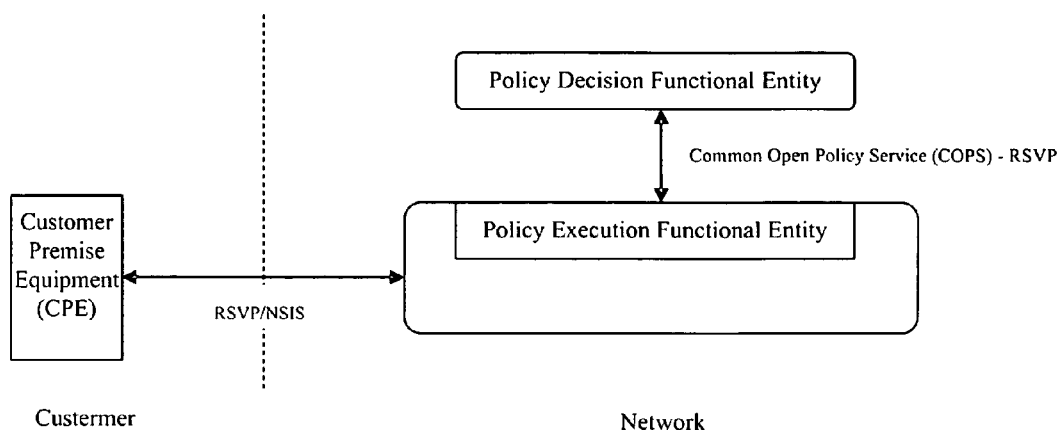
FIG. 3 is a schematic diagram of IntServ and its policy control model.
Figure 4:
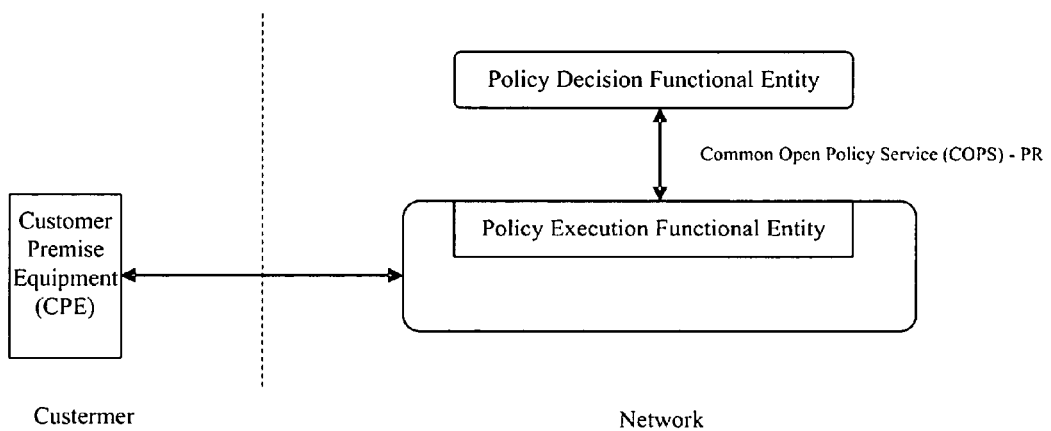
FIG. 4 is a schematic diagram of DiffServ and its policy control model.
Figure 5:
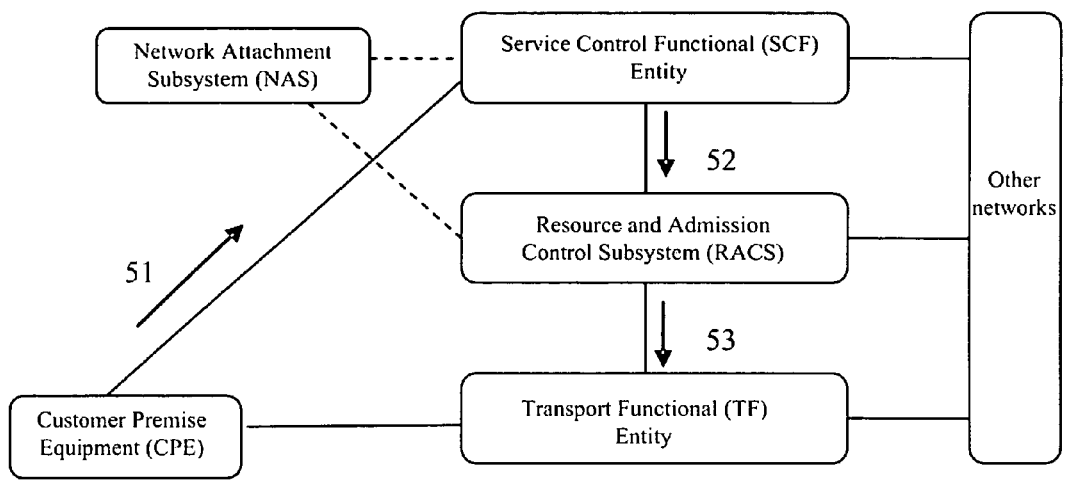
FIG. 5 to FIG. 9 are flow charts of an embodiment of the method described in the present invention.

To this end, first, the present invention provides a system of dynamic QoS negotiation in NGN. The structure of the system according to an embodiment of the present invention is shown in FIG. 5, the system including:

a Resource and Admission Control Subsystem (RACS), which is adapted to obtain the QoS parameter information required by a media flow of a service transferred in NGN, determine admission control decision parameters based on the QoS parameter information and transport network resource availability information, and send the admission control decision parameters to concerned transport functional entities;

the RACS obtains the QoS parameter information mainly via a service control functional entity; the RACS can also obtain the QoS parameter information via NASS, or via the transport functional entities;

the transport functional entity, which is adapted to obtain admission control decision parameters sent from the RACS and execute the admission control decision parameters to implement QoS treatment for the media flow of the service transferred in NGN;

The service control functional entity, which is adapted to communicate with a user terminal to obtain directly or indirectly the QoS parameter information required by the service requested by the user terminal and send the QoS parameter information to the RACS;

when the user terminal is to develop a service, it has to initiate a service request to the service control functional entity first, and the request can carry the QoS parameter information required by the service; also, the service control functional entity can obtain the QoS parameter information of the media flow of the service through negotiation between the user terminal and the opposite user or an application server; in addition, the service control functional entity can determine the corresponding QoS parameter information in accordance with the type of the service requested by the user terminal;

a Network Attachment Subsystem (NASS), which communicates with the RACS and the service control functional entities to provide them user profile information associated with the service.

Based on the RACS and the interface relationship between the RACS and the external entities in NGN, the present invention provides a framework and a method to enable a user terminal (i.e., CPE) to request and negotiate QoS with the network in NGN environment, and thereby, through the interaction between the user terminal and the network as well as the interaction between the network service layer and the transport layer, to support QoS assurance for the services requested by user terminals with different QoS negotiation capabilities and various business models.

On the basis of above mentioned system, the present invention also provides a processing information flow to enable a user terminal to request and negotiate QoS with the network in NGN environment. As shown in FIG. 5, the service control functional (SCF) entity is responsible for functions of service session setup, control, and termination in the service subsystems, such as call session control function (CSCF) in IP Multimedia Subsystem. The present invention utilizes the interaction between CPE and SCF entity or transport functional (TF) entity to transfer QoS request and acknowledge information, and utilizes the RACS to process the interaction and negotiation on QoS support between SCF entity and TF entity, so as to implement an end-to-end QoS control and thereby meet the QoS request of the user terminal.

In the present invention, in order to implement resource usage-based charging, the SCF entity and the RACS need to interact with the TF entity, to collect resource usage information for charging for the user service.

The present invention can support user terminals with different QoS negotiation capabilities and various business models.

User terminals can be classified into the following categories, regarding the different QoS negotiation capabilities:

1. User terminals unable to send explicit QoS requests by way of any signaling;

2. User terminals that support initiating resource reservation requests in dedicated QoS signaling, such as RSVP or NSIS;

3. User terminals that support negotiating QoS requirement in service signaling such as Session Initiation Protocol/Session Description Protocol (SIP/SDP), etc.;

4. User terminals that support negotiating QoS with cooperation of service signaling and dedicated QoS signaling.

The business models can be classified into three categories, regarding the QoS differentiation level:

1. QoS differentiation at application flow level: before a media flow of a service with transport QoS requirements are started, the user terminal needs to initiate a definite QoS request to the network for the media flow; the media flow is treated in the network with the QoS parameters expected in the user QoS request; different media flows may be treated in the network at different QoS levels;

2. QoS differentiation at service type level: the user does not need to initiate a QoS request explicitly, while the QoS requirement for the service is implied by the service type; the network is responsible for determining the QoS level required by the traffic flow in accordance with the service type; the traffic flows of different types of services may be treated at different QoS levels;

3. QoS differentiation at user level: in accordance with the Service Level Agreement (SLA) signed between the user and the network operator, the user traffic flow will be treated at the QoS level expected in the SLA; the traffic flows of different users may be treated at different QoS levels.

The prevent invention provides several QoS request and negotiation processing flows for user terminals with different QoS capabilities and different business models; though those processing flows are the same in the fundamental principle, they are different in implementation approach; the operator can choose the appropriate QoS request and negotiation processing flow, in accordance with the QoS negotiation capability of the user terminal and the expected business model.

First, the fundamental principle of the method described in the present invention is described hereunder:

When the CPE is to develop a service requiring corresponding QoS assurance, the RACS in NGN obtains the corresponding QoS request information, performs authentication, and makes admission control decision for the QoS request information of the service. Since transport network status information such as network resource usage and network performance may be known in the RACS, the most reasonable admission control decision parameters can be determined for the corresponding service in accordance with the actual conditions of the network.

Now, the method provided in the present invention is described, with reference to the accompanying drawings and preferred embodiments. The embodiments involve QoS request and negotiation processing flows implemented in accordance with the user terminals with different QoS negotiation capabilities and business models, respectively. Hereunder the QoS request and negotiation processing flows will be described in several examples.

1. When the business model is QoS differentiation at service type level, the QoS requirement of a user service will be implied by the service type; in addition, the QoS request will be initiated by an SCF entity or a signaling gateway as an agent of the user in accordance with the user service type.

A corresponding and specific QoS request and negotiation processing flow, i.e., a corresponding dynamic QoS negotiation processing flow as shown in FIG. 5, includes the following steps:

step 51: the user initiates a service request, e.g., call setup request, to the network; wherein, it is not required to contain the QoS requirement parameters of the current service explicitly in the service request;

step 52: when the SCF entity or signaling gateway receives the user service request, it determines the QoS parameters required for the current service in accordance with the service type; the QoS parameters include: the bandwidth required for the current service as well as allowable delay, jitter, and packet loss rate, etc.;

at the same time, the SCF entity or signaling gateway needs to send a QoS request (containing the QoS parameter information) for the current service to the RACS as an agent of the user;

certainly, when a service includes a plurality of data flows at a time, it is required to determine the QoS parameters for each data flow and to send the corresponding QoS requests at the SCF entity or signaling gateway;

step 53: when the RACS receives the QoS request, it performs authentication and makes admission control decision on the received QoS request in accordance with user profile, operator-specific policy rules, and resource availability, to determine the corresponding admission control decision parameters;

in detail, when the RACS receives the QoS request, it is required to obtain the user profile and operator-specific policy rules, such as user identity information, SLA information, and the network configuration information corresponding to the user, etc.; in addition, RACS needs to check the availability of the current network resources, such as available bandwidth resource, occupied bandwidth resource, and network performance of the data flow path of the user in the network; after obtaining above information, the RACS can perform authentication and make admission control decision on the QoS request of the service in accordance with the obtained resource availability information;

in addition, when RACS determines to permit the service to be transported in the network in accordance with the requested QoS parameters, it sends admission control decision parameter information such as gate control, bandwidth allocation, (Differentiation Service Code Point) DSCP mark, and outgoing aggregation path information etc. to the TF entity at the boundary of the network for traffic forwarding;

the QoS request and negotiation flow provided in step 51 to step 53 is especially suitable for voice service and simple terminals.

Figure 6:
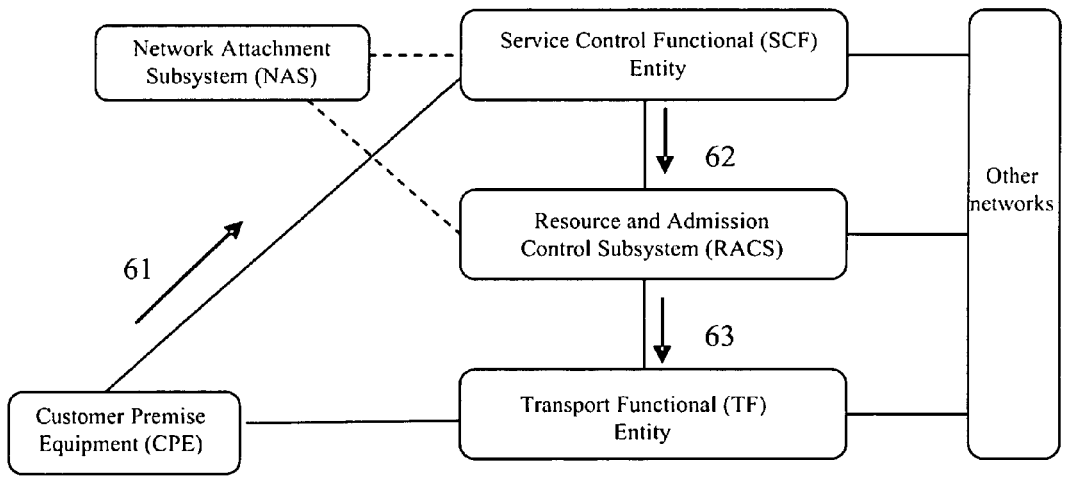

2. When the user terminal supports initiating explicit QoS requests to the network service layer via service signaling such as SIP/SDP etc., the specific dynamic QoS negotiation processing flow as shown in FIG. 6 includes:

first, the user terminal initiates a service request, e.g., call setup request, to the network; during the service setup process, the user terminal can negotiate the QoS parameters required for the current service with the opposite terminal or application server via service layer signaling (e.g., session description protocol of SIP or capability exchange protocol of H.323); the specific negotiation procedures may be identical to those in the prior art, and will not be defined in the present invention;

if a service includes a plurality of media flows, the corresponding QoS parameters have to be negotiated for each of the media flows respectively.

step 61: after the user terminal obtains the QoS parameters through negotiation, it sends a service request carrying the QoS parameters to the SCF entity;

step 62: when the SCF entity receives the user service request, it extracts the QoS parameters from the service request, and then forwards the QoS request to the RACS;

step 63: based on user profile, operator-specific policy rules, and resource availability, the RACS performs authentication and makes admission control decision on the received QoS request; when the RACS determines to permit media flows of the service to be transferred in the network in accordance with the requested QoS parameters, it sends gate control, bandwidth allocation, DSCP marking control, outgoing aggregation path control information, etc., to the TF entity at the boundary of the network for traffic forwarding.

The QoS request and negotiation processing flow provided in step 61 to step 63 is suitable for multimedia services and terminals.

3. The User terminal initiates an explicit QoS request to the network service layer via a path-decoupling dedicated QoS signaling; the path-decoupling QoS signaling indicates that the QoS signaling path is independent to the user data flow path to which it provides service.

Figure 7:
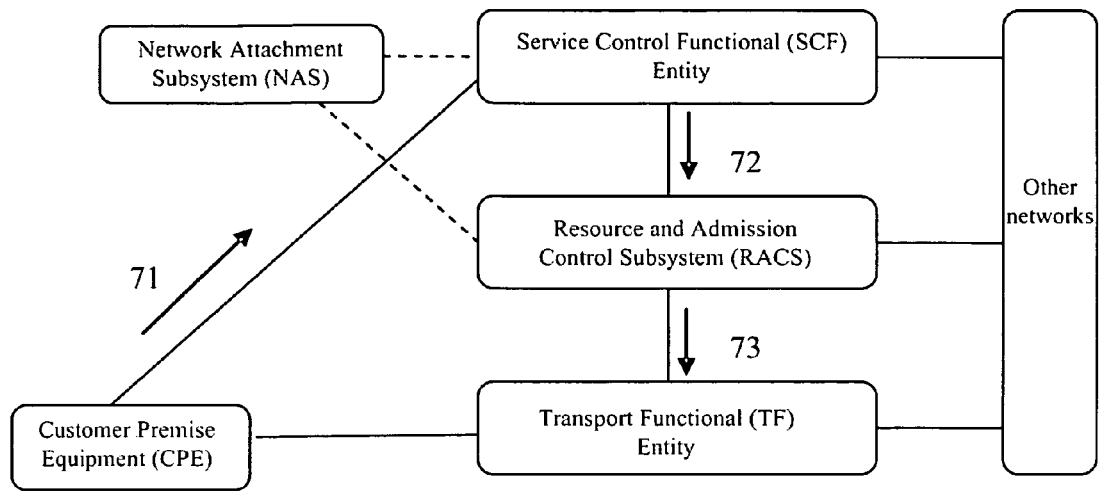

In that case, the specific dynamic QoS negotiation processing flow as shown in FIG. 7 includes:

step 71: the user initiates an explicit QoS request to the network service layer (i.e., SCF entity) via a path-decoupling dedicated QoS signaling for a data service at a time or a certain data service that requires QoS assurance; the QoS request contains the media flow identification information, such as source and destination addresses, port, and protocol type of the media flow, etc.;

step 72: when the SCF entity receives the QoS request, it performs authentication for the data service in accordance with the media flow identification information, and forwards the QoS request of the current service to the RACS after successful authentication;

Step 73: based on user profile, operator-specific policy rules, and resource availability, the RACS performs authentication and make admission control decision on the received QoS request after it receives the QoS request message; if the RACS determines to permit media flows of the service to be transferred in the network in accordance with the requested QoS parameters, it sends gate control, bandwidth allocation, DSCP marking control, outgoing aggregation path control commands, etc., to the TF entity at the boundary of the network for traffic forwarding.

The QoS request and negotiation processing flow described in step 71 to step 73 is suitable for point-to-point or point-to-multipoint data services that require QoS assured paths.

Figure 8:
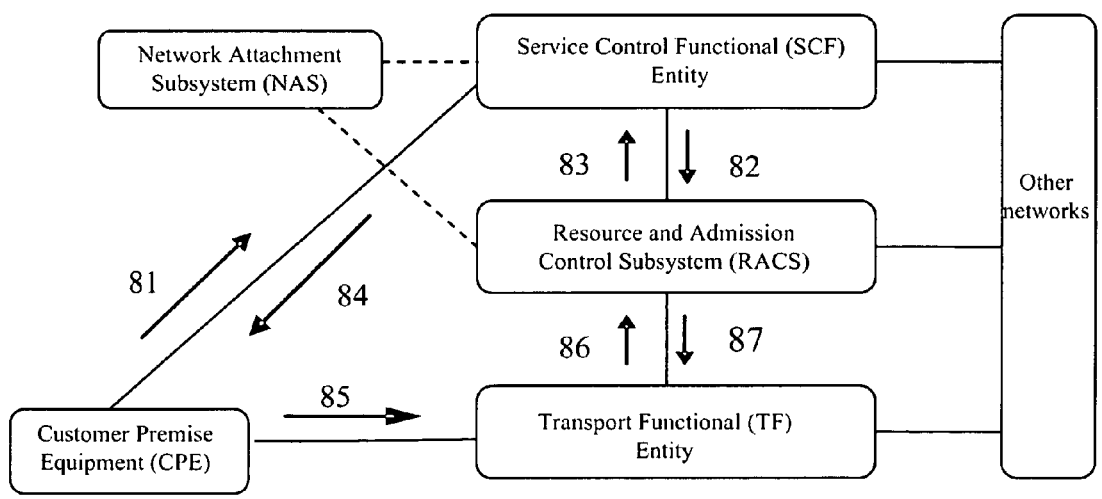

4. When the user terminal performs a two-stage QoS request and negotiation via the cooperation of service signaling with path-coupling dedicated QoS signaling, the corresponding specific dynamic QoS negotiation processing flow as shown in FIG. 8 may be divided into two stages; the path-coupling QoS signaling indicates that the QoS signaling path is identical to the user data flow path to which it provides service; hereunder the two stages will be described:

In the first stage:

step 81: the user initiates a service request (e.g., call setup request) to the network via the SCF entity, and during the service setup process, negotiates the QoS parameters required for current service with the opposite user or application server via SDP or capability exchange of H.323;

if a service contains a plurality of media flows at a time, the corresponding QoS parameters need to be negotiated for each of the media flows;

step 82: when the SCF entity receives the service request of the user terminal, it extracts the QoS parameters to be negotiated from the request, and then sends a resource authentication request to the RACS;

step 83: when the RACS receives the resource authentication request, it obtains the user profile and operator-specific policy rules, and determines availability of the current network resources; then, based on the user profile, operator-specific policy rules, and availability of current transport resources, the RACS performs authentication on the received QoS request; if the RACS determines to permit the service to be transported in the network in accordance with the negotiated QoS parameters, it sends an acknowledgement and an admission token (i.e., Token) to the SCF entity;

step 84: when the SCF entity receives the admission token, it notifies the admission token to the corresponding user terminal;

It should be noted that the steps 82 to 84 in the first stage can be omitted in the case of a simplified procedure, and in this case, in the second stage, only the negotiated QoS requirement parameters are carried or processed, but the token is not needed to be carried or processed.

In the second stage:

step 85: the user terminal initiates a resource reservation request to the network transport layer via a path-coupling dedicated QoS signaling protocol (e.g., RSVP or NSIS), the request carrying the QoS requirement parameters negotiated in the service setup process and the admission token;

step 86: when the TF entity at network boundary receives the resource reservation request, it sends the admission token and the resource reservation request to the RACS;

step 87: when the RACS receives the QoS request, it performs admission control in accordance with the admission token in the request; and if the RACS determines to permit the media flow of the service for the user terminal to be transferred in the network in accordance with the negotiated QoS parameters, it sends a resource reservation response as well as gate control, bandwidth allocation, DSCP marking control, and outgoing aggregation path control commands, etc., to the TF entity at network boundary;

when the TF entity at network boundary receives the resource reservation response, it forwards or terminates the resource reservation request of the user.

The dynamic QoS negotiation processing flow described in step 81 to step 87 is especially suitable for mobile multimedia services and terminals.

In order to be compatible with the prior art, the present invention also provides the following two dynamic QoS negotiation processing flows.

Figure 9:
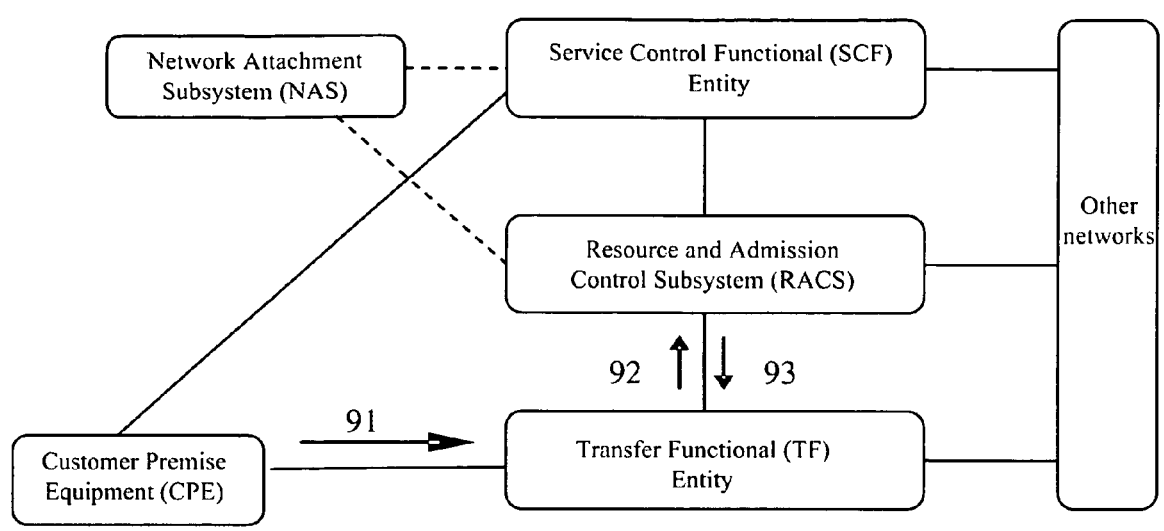

The first one: if a user terminal directly initiates a resource reservation request to the network transport layer via a dedicated path-coupling QoS signaling, the employed dynamic QoS negotiation process as shown in FIG. 9 includes:

step 91: the user directly initiates the resource reservation request to the network transport layer (i.e., the TF entity at network boundary) via a dedicated path-coupling QoS signaling such as RSVP or NSIS etc.;

step 92: when the TF entity at network boundary receives the resource reservation request, it sends a resource reservation request carrying the user resource reservation request information to the RACS;

step 93: when the RACS receives the resource reservation request, it obtains the user profile, operator-specific policy rules, and availability of the current transport resources, and performs authentication and makes admission control decision on the received resource reservation request; if the RACS determines to permit the request, it sends a resource reservation response as well as gate control, bandwidth allocation, DSCP marking control, outgoing aggregation path control commands, etc., to the TF entity at network boundary; when the TF entity receives the resource reservation response, it forwards or terminates the resource reservation request of the user.

The dynamic QoS negotiation processing flow described in step 91 to step 93 is a QoS parameter transfer approach adapted for the compatibility with the IntServ/RSVP and its policy control model put forward by IETF as described in the prior art.

The second one: a dynamic QoS negotiation processing flow that is used when a user does not perform dynamic QoS negotiation with the network but subscribes a service level protocol (i.e. SLA) containing the QoS requirement parameters with the operator. The processing flow is detailed as: based on the QoS requirement parameters in the SLA subscribed by the user with the operator, the NMS or NASS configures the gate control, bandwidth allocation, DSCP marking control, and outgoing aggregation path control parameters onto the TF entity at network boundary via the RACS. That processing flow may be compatible with the QoS request and negotiation processing approach that is used in the Diffserv and its policy control model put forward by IETF, as described in the prior art.

Though the present invention is described with above preferred embodiments, the protective scope of the present invention shall not be restricted by those embodiments. Any technician skilled in the field can be easily suggested modifications or alternations to the present invention with the technical scope disclosed in the present invention; any of such modifications or alternations shall be covered by the protected scope of the present invention as defined by the claims accompanied hereunder.

The invention claimed is:

1. A system of dynamic QoS negotiation in a Next Generation Network (NGN), comprising a Resource and Admission Control Subsystem (RACS), a Transport Functional (TF) entity, a Service Control Functional (SCF) entity and a Network Attachment Subsystem (NASS), wherein:

the RACS has interfaces with the TF entity, the SCF entity and the NASS;

the SCF entity, configured to receive a service request from a user terminal, when the service request does not carry QoS requirement parameters of a service of the user terminal, determining, by the SCF entity, a service type in accordance with the service request, and determining the QoS requirement parameters required for the service in accordance with the service type; when the service request carries the QoS requirement parameters of the service, obtaining, by the SCF entity, the QoS requirement parameters of the service by parsing the service request;

the RACS, configured to process a resource reservation request required for the service of the user terminal and obtain QoS requirement parameters required by the service from the resource reservation request, perform authentication and determine admission control decision parameters based on the QoS requirement parameters in accordance with operation policy rules, a user profile stored in the NASS and availability of transport network resources, and send the admission control decision parameters to a concerned TF entity for execution;

the TF entity, configured to ensure QoS of the service of the user terminal according to the admission control decision parameters;

wherein when the user terminal is a mobile terminal, the SCF entity sends a resource authentication request containing the QoS requirement parameters of the service to the RACS via a corresponding interface with the RACS, the RACS notifies the user terminal via the SCF entity after authenticating successfully, and the user terminal initiates a resource reservation request to the TF entity of the network via a path-coupling QoS signaling carrying the QoS requirement parameters of the service; handling by the TF entity at a network boundary the QoS signaling and sending a resource reservation request containing the QoS requirement parameters of the service to the RACS via a corresponding interface with the RACS; and wherein when a token mechanism is used, the RACS returns an admission token to the user terminal via the SCF entity after authenticating successfully and checks whether a resource reservation request has passed the authentication and searches for relevant information of the service in accordance with the admission token, and wherein the admission token is carried in a path-coupling QoS signaling and transferring the admission token to the RACS via the resource reservation request.

2. The system as in claim 1, wherein:

the SCF entity is further configured to send the QoS requirement parameters to said RACS.

3. The system as in claim 2, wherein the system further comprises:

the NASS, configured to manage and configure a user access network, communicate with said RACS and said SCF entity, and provide said RACS and said SCF entity with user profile information associated with the service.

4. The system as in claim 1, wherein the RACS obtains the QoS requirement parameters from the TF entity, the SCF entity or the NASS.

5. A method of dynamic QoS negotiation based on a system of dynamic QoS negotiation in a Next Generation Network (NGN), the system comprising a Resource and Admission Control Subsystem (RACS), a Transport Functional (TF) entity, a Service Control Functional (SCF) entity and a Network Attachment Subsystem (NASS), wherein the RACS has interfaces with the TF entity, the SCF entity and the NASS, the method comprising:

A. receiving, by the SCF entity, a service request from a user terminal, when the service request does not carry QoS requirement parameters of a service of the user terminal, determining a service type in accordance with the service request, and determining the QoS requirement parameters required for the service in accordance with the service type; when the service request carries the QoS requirement parameters of the service, obtaining the QoS requirement parameters of the service by parsing the service request;

B. processing, by the RACS, a resource reservation request required for the service of the user terminal and obtaining, by the RACS, QoS requirement parameters required by the service from the resource reservation request;

C. performing, by said RACS, authentication and determining admission control decision parameters based on the QoS requirement parameters in accordance with operation policy rules, a user profile stored in the NASS and availability of transport network resources;

D. sending, by said RACS, the admission control decision parameters to the TF entity at a network boundary, and executing, by said transport functional entity at the network boundary, the admission control decision parameters to process and transfer the service of the user terminal accordingly;

wherein when the user terminal is a mobile terminal, the SCF entity sends a resource authentication request containing the QoS requirement parameters of the service to the RACS via a corresponding interface with the RACS, the RACS notifies the user terminal via the SCF entity after authenticating successfully, and the user terminal initiates a resource reservation request to the TF entity of the network via a path-coupling QoS signaling carrying the QoS requirement parameters of the service; handling by the TF entity at a network boundary the QoS signaling and sending a resource reservation request containing the QoS requirement parameters of the service to the RACS via a corresponding interface with the RACS; and wherein when a token mechanism is used, the RACS returns an admission token to the user terminal via the SCF entity after authenticating successfully and checks whether a resource reservation request has passed the authentication and searches for relevant information of the service in accordance with the admission token, and wherein the admission token is carried in a path-coupling QoS signaling and transferring the admission token to the RACS via the resource reservation request.

6. The method as in claim 5, wherein when the service comprises a plurality of media flows, it is needed to determine the QoS requirement parameters for each of the media flows respectively.

7. The method as in claim 5, wherein when the user terminal is a fixed terminal, and wherein the method further comprises:

the SCF entity sending a resource reservation request containing the QoS requirement parameters of the service to the RACS via a corresponding interface with the RACS.

8. The method as in claim 5, wherein said determining by the RACS the admission control decision parameters comprises:

obtaining, by the RACS, user profile information of the service and policy rules information configured by an operator, making admission control decisions for the QoS requirement parameters of the service based on the user profile information and the policy rules information, deciding whether to permit a media flow of the service to enter into a transport network and to be treated with the requested QoS, and determining the admission control decision parameters.

9. The method as in claim 8, wherein determining by said RACS the admission control decision parameters further comprises:

obtaining, by the RACS, current status information of transport resources in the network, making admission control decisions for the QoS requirement parameters of the service based on the current status information, checking whether there are enough transport resources available in the network to meet the QoS requirement parameters of the service, and determining the admission control decision parameters.

10. The method as in claim 5, wherein the admission control decision parameters comprise:

gate control, bandwidth allocation, Differentiated Service Code Point mark, and outgoing aggregation path control information.

11. The method as in claim 5, wherein the QoS requirement parameters comprise:

bandwidth required for transporting the media flow of the service, as well as allowable delay, jitter, and packet loss rate.

12. The method as in claim 5, further comprising:

directly initiating, by a user terminal, a resource reservation request to the TF entity for a media flow of a developed service via a dedicated path-coupling QoS signaling;

upon receiving the resource reservation request from the user terminal, sending, by the TF entity at the network boundary, a resource reservation request carrying the QoS requirement parameters of a media flow of the user service to the RACS, and executing step D.

13. The method in claim 5, further comprising:

configuring, by the Network Management System (NMS) or the Network Attachment Subsystem (NASS), gate control, bandwidth allocation, Differentiated Service Code Point (DSCP) marking control, and outgoing aggregation path control parameters onto the TF entity at the network boundary via the RACS.

* * * * *